No. 606,660. Patented July 5, 1898.
J. C. HENDERSON.
GAS HEATING AND EXPANDING DEVICE.
(Application filed Aug. 4, 1897.)
(No Model.)
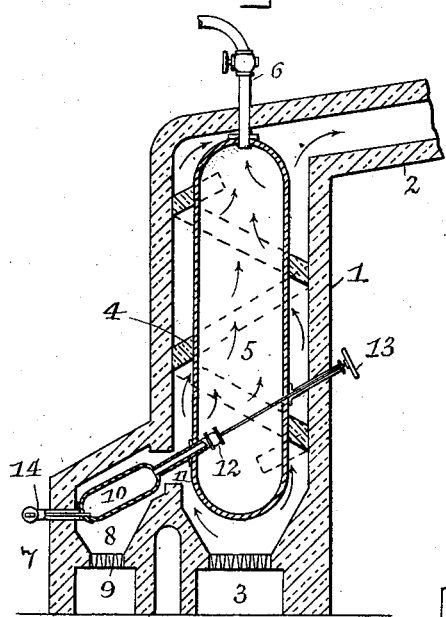
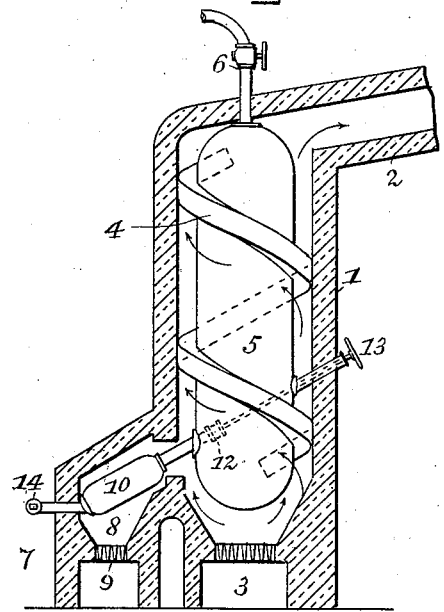
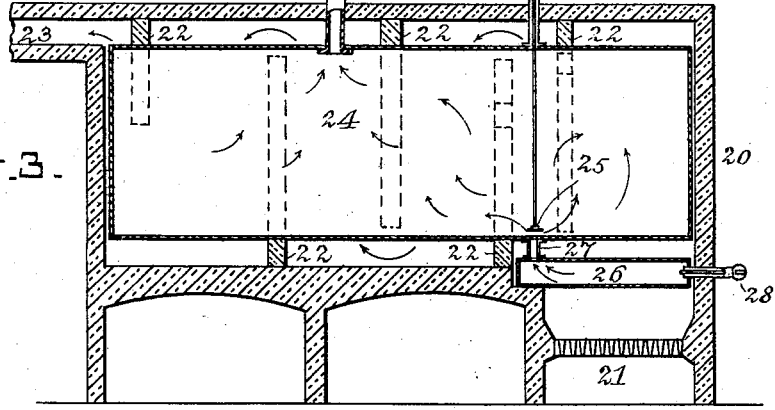
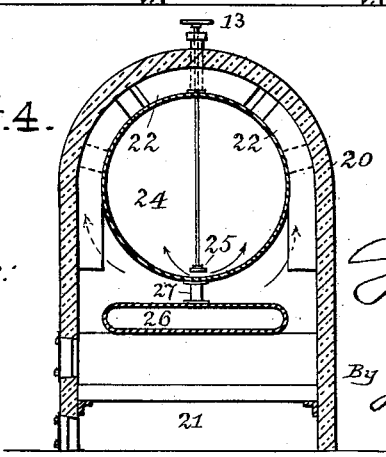
Witnesses:
E. B. Bolton
D. C. Kelsey
Inventor:
John C. Henderson
By James R. Rogers
his Attorney.

UNITED STATES PATENT OFFICE.

JOHN C. HENDERSON, OF NEW YORK, N. Y.

GAS HEATING AND EXPANDING DEVICE.

SPECIFICATION forming part of Letters Patent No. 606,660, dated July 5, 1898.

Application filed August 4, 1897. Serial No. 647,121. (No model.)

*To all whom it may concern:*

Be it known that I, JOHN C. HENDERSON, a citizen of the United States, residing at New York, in the county of New York and State of New York, have invented certain new and useful Improvements in Gas Heating and Expanding Devices; and I do hereby declare the following to be a full, clear, and exact description of the invention, such as will enable others skilled in the art to which it appertains to make and use the same.

This invention relates to improvements in gas heating and expanding apparatus, and particularly to that class thereof whereby heat lost by expansion is supplied as suddenly as possible while expanding into the expansion-chamber, for heretofore in the expansion of gases from and at the point of liquefaction to pressure at and above the temperature of their critical point it can only be done, if required, at a constant temperature and pressure by the use of an enormously-large heater, expanding vessel, or chamber, as the injected liquid on coming into contact with the gas heats up slowly on account of the very low conducting power of the gas itself.

To maintain a constant pressure in the heater or expanding-chamber while the heated and expanded gas is being drawn off or extracted at a temperature and pressure above its critical point at a rate controlled by the admission of the liquid gas and the continuous application of the requisite amount of heat, it has been necessary in former apparatus to heat up the gas from its liquid state to its superheated and dense state slowly and by stages or repeated heating on account only of the low increase of volume by heat, as well as the very low conductivity of the gas.

In a heater or expansion-chamber using the gas below its critical point the case is entirely different, and any heater or expansion-chamber similar in all respects to a steam-boiler is all that is required, as there is always a sufficient quantity of liquid gas in the heater to quickly heat up the incoming liquid and maintain the pressure at the same time.

To overcome the difficulty of using gas above its critical point and at the same time reduce the capacity of the heating-chamber required, as well as the time occupied, the herein-described presuperheating apparatus has been constructed, which is adapted to form part of and operate in connection with a heater or expanding-chamber for gases used at or above their liquid critical point; but it is not to be confounded with an ordinary auxiliary heater for feed-water, &c., in the case of steam-generators, &c., as in that case it is only used to bring up the entering media to or near the boiling-point of the liquid, while the presuperheating apparatus herein described is to supply as suddenly as possible the heat lost by expansion while expanding into an expansion-chamber. Neither is it to be confounded with a flash-boiler for steam purposes, as that is only employed to save space, weight, &c., to the detriment of the life of the apparatus.

If gas in its liquid state is heated up gradually, or if from loss of pressure it expands into gas slowly, then the time and surface required to heat it up is very great. Therefore to reduce both the time and heating-surface required the presuperheater hereinafter described is employed as an attachment to a gas heater or expansion chamber; and with these and other objects in view the invention consists, substantially, in the construction, combination, and arrangement of parts hereinafter more fully described in the specification and illustrated in the accompanying drawings, in which—

Figure 1 is a vertical longitudinal section of a heater or expansion-chamber provided with my improvements. Fig. 2 is a similar section, partly in elevation. Fig. 3 is a vertical longitudinal section of a modified form of construction, and Fig. 4 is a vertical transverse section of the construction shown in Fig. 3.

Similar characters of reference designate like parts throughout the several views.

Referring to the drawings, and particularly to Figs. 1 and 2 thereof, the reference character 1 indicates a heater or similar apparatus, of which any preferred construction can be employed, provided with a suitable flue 2 and a furnace 3, and the heater is also preferably provided with a spiral or other partition 4, and arranged longitudinally thereof is an expansion-chamber 5, located directly above the furnace 3, having an outlet or escape pipe 6, as shown.

Arranged at one side of the heater or in any desired manner is my improved presuperheating attachment 7, preferably consisting of a chamber 8, in the lower portion of which is located a furnace 9, and above the furnace 9 is located in any suitable manner a presuperheater 10, of any preferred construction or form, connected by means of a pipe or tube 11 with the expansion-chamber 5, and this pipe or tube 11 is preferably provided with a valve 12, the rod of which extends beyond the exterior walls of the heater, the extremity being provided with a handle 13, by means of which the valve can be operated in case of accident, and the presuperheater 10 is also provided with a water-jacketed liquid-inlet 14, as shown.

The construction of the presuperheater is preferably such as to present the greatest amount of surface to the incoming liquid, the surfaces at the same time to be as much broken up as possible and the liquid impinging against the broken and heated surfaces in as fine a mechanically-divided spray as possible, and the presuperheater should receive the direct impact of the fire or should occupy the position of highest temperature; also, the interior of the same may be filled with any well-known cellular or porous high conducting material, either metallic or mineral, or with artificial products—such as spongy metals, blown or burned bricks, &c.—the use of charcoal or coke being dangerous when using some gases at high heat on account of decomposition, &c.

The connection for the supply of liquid should be as close as possible and outside the furnace or flue line and surrounded by water (in the same manner as a twyer in a blast-furnace) of a temperature sufficient only to insure liquidity, and the connection to the expanding-chamber should be as large as possible, so as to allow as rapid a transmission from the presuperheater as possible.

In Figs. 3 and 4 is illustrated a modification of the construction before described particularly adapted for a single furnace, wherein a heater 20 is provided with a furnace 21, baffle ledges or partitions 22, and a flue 23, and mounted within the partitions 22 is an expansion-chamber 24, having a valve 25, and located above the furnace in any desired manner is a presuperheater 26, connected by a pipe or tube 27 with the expansion-chamber 24, and the presuperheater is provided with a water-jacketed liquid-inlet 28, as clearly shown in the drawings.

I do not desire to confine myself to the construction, combination, or arrangement of parts herein shown and described, and I reserve the right to make all such changes in and modifications of the same as fairly come within the scope of my invention.

Having fully described my invention, what I claim as new, and desire to secure by Letters Patent, is—

1. A gas-heating apparatus provided with a large and small chamber, the small chamber being a presuperheater, for suddenly heating the medium by one application of the direct action of heat.

2. A presuperheating attachment for gas-heating apparatus independent of and separated from the heating or expanding chamber, and having suitable connections therewith and means for supplying the medium to the presuperheater whereby the medium is suddenly heated by one application of the direct action of heat.

3. A gas-heating apparatus, consisting of an expansion-chamber, a separate and independent presuperheater to suddenly heat the medium by one direct application of heat while expanding into the expansion-chamber, connections between said parts, and means for supplying the medium to the presuperheater.

4. A gas-heating apparatus, consisting of a furnace, an expansion-chamber adjacent thereto, a separate and independent presuperheater to heat the medium by the direct action of the furnace while expanding into the expanding-chamber, connections between the presuperheater and expansion-chamber, a valve or valves to control said connections and means for supplying the medium to the presuperheater.

5. A gas-heating apparatus consisting of an expansion-chamber, a furnace adjacent thereto, a presuperheating-chamber receiving the direct heat from said furnace, and in juxtaposition to said expansion-chamber and communicating therewith and means for introducing the medium to the presuperheater, whereby the medium is suddenly and directly heated from the furnace while expanding into said expansion-chamber.

In testimony whereof I affix my signature in presence of two witnesses.

JOHN C. HENDERSON.

Witnesses:
C. S. ROGERS,
D. C. KELSEY.